(12) United States Patent
Paparcone

(10) Patent No.: US 10,864,827 B2
(45) Date of Patent: Dec. 15, 2020

(54) HIGH SENSIBILITY PRESSURE SENSOR

(71) Applicant: B810 SOCIETÀ A RESPONSABILITÀ LIMITATA, Reggio Emilia (IT)

(72) Inventor: Massimiliano Paparcone, Reggio Emilia (IT)

(73) Assignee: B810 SOCIETÀ A RESPONSABILITÀ LIMITATA, Reggio Emilia (IT)

( * ) Notice: Subject to any disclaimer, the term of this patent is extended or adjusted under 35 U.S.C. 154(b) by 0 days.

(21) Appl. No.: 16/479,336

(22) PCT Filed: Jan. 16, 2018

(86) PCT No.: PCT/IB2018/050248
§ 371 (c)(1),
(2) Date: Jul. 19, 2019

(87) PCT Pub. No.: WO2018/134724
PCT Pub. Date: Jul. 26, 2018

(65) Prior Publication Data
US 2019/0351785 A1 Nov. 21, 2019

(30) Foreign Application Priority Data
Jan. 23, 2017 (IT) .................. 102017000006845

(51) Int. Cl.
*G01L 5/00* (2006.01)
*B60N 2/00* (2006.01)
*B60N 2/28* (2006.01)
*G01P 15/18* (2013.01)
*G01V 9/00* (2006.01)
*G08B 21/02* (2006.01)

(52) U.S. Cl.
CPC ............ *B60N 2/002* (2013.01); *B60N 2/2881* (2013.01); *G01L 5/00* (2013.01); *G01P 15/18* (2013.01); *G01V 9/00* (2013.01); *G08B 21/0277* (2013.01)

(58) Field of Classification Search
CPC ......... B60N 2/002; B60N 2/2881; G01L 5/00; G01P 15/18; G01V 9/00; G08B 21/0277
USPC ......................................................... 73/774
See application file for complete search history.

(56) References Cited

U.S. PATENT DOCUMENTS

| 4,177,496 A | 12/1979 | Bell et al. |
| 5,381,299 A | 1/1995 | Provenzano et al. |
| 5,510,276 A * | 4/1996 | Diem ................. B81C 1/00158 148/DIG. 135 |
| 2003/0062996 A1 | 4/2003 | Flanagan et al. |

(Continued)

FOREIGN PATENT DOCUMENTS

| EP | 2374652 A1 | 10/2011 |
| WO | 2012053619 A1 | 4/2012 |
| WO | 2012109472 A2 | 8/2012 |

*Primary Examiner* — Max H Noori
(74) *Attorney, Agent, or Firm* — Volpe Koenig

(57) ABSTRACT

A pressure sensor includes a first layer of electrically insulating material, a second layer of electrically insulating material superposed on the first layer, and at least one electrical switch. The electrical switch includes: at least one electrical contact associated with the first layer, and an electrical conductor associated with a flexible portion of the second layer, which is separate from the first layer and is directly superposed on said electrical contacts.

13 Claims, 2 Drawing Sheets

(56) References Cited

U.S. PATENT DOCUMENTS

| | | | | |
|---|---|---|---|---|
| 2003/0102875 | A1* | 6/2003 | Fujiwara | G01D 5/2405 324/663 |
| 2006/0065060 | A1* | 3/2006 | Ito | A61B 5/6892 73/862.046 |
| 2013/0050126 | A1* | 2/2013 | Kimura | G06F 3/0412 345/173 |
| 2014/0110705 | A1* | 4/2014 | Koezuka | H01L 21/022 257/43 |
| 2014/0110707 | A1* | 4/2014 | Koezuka | H01L 29/78696 257/43 |

* cited by examiner

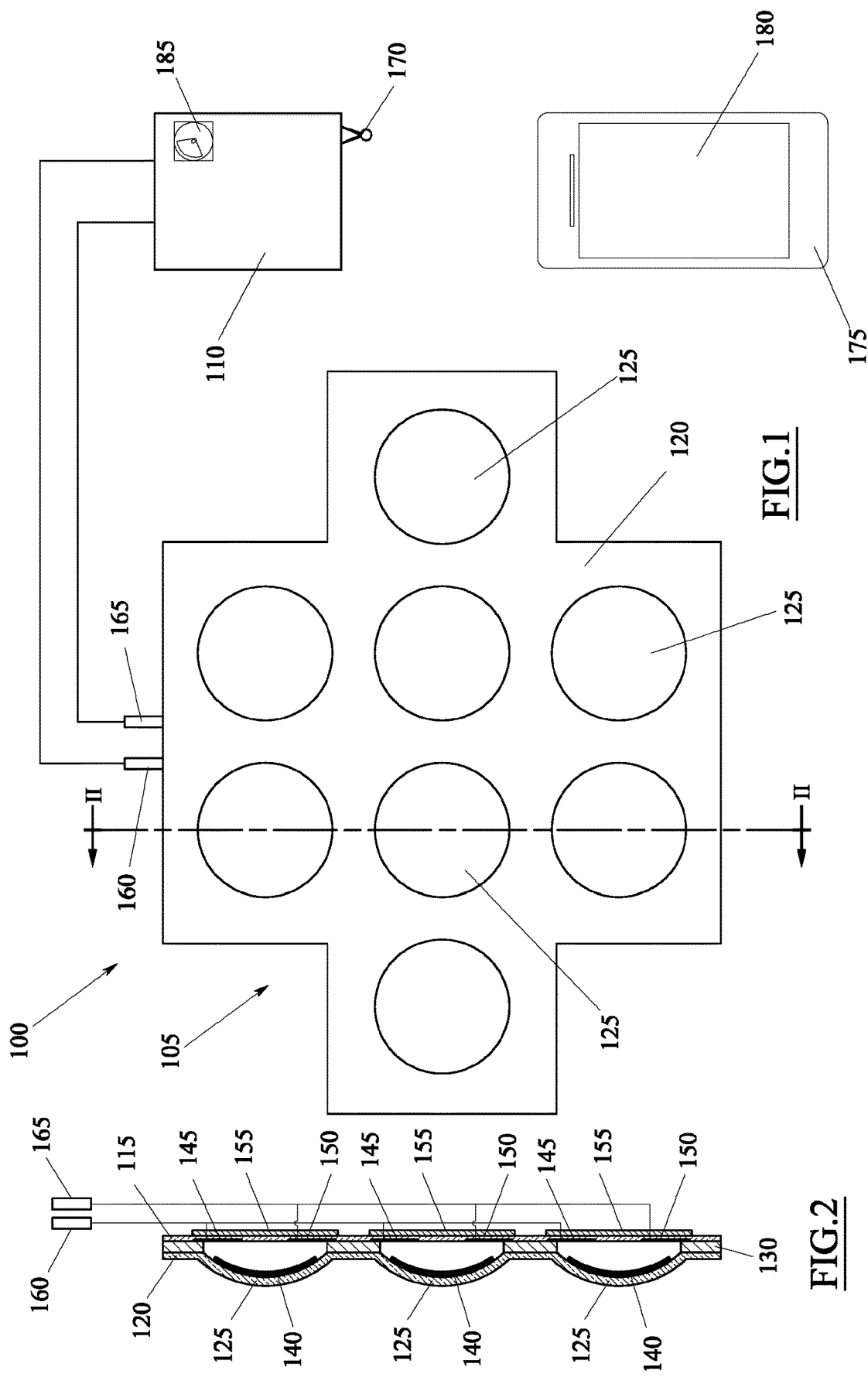

HIGH SENSIBILITY PRESSURE SENSOR

TECHNICAL FIELD

The present invention relates to a pressure sensor and, more specifically, a pressure sensor to be used to detect the presence of a person on a seat, e.g. a chair, an armchair or a car seat for children.

PRIOR ART

It is well known that transporting a child in a car requires use of a seat that raises the child's upper body relative to the plane of seat, in order to be able to use the seatbelts of the car.

A known problem consists of the fact that in rare cases, which however frequently have extremely negative outcomes, the parent can forget the child seated on the car seat, especially if (s)he is positioned on a rear seat, and leave the car.

To solve this problem, monitoring systems are known, which detect the child's presence on the car seat and send an alarm signal to the parent, if the latter should move away from the car while the child is still positioned on the car seat.

To detect the presence of the child, some of these systems use a pressure sensor incorporated in the car seat, which is activated by the weight of the child when the latter is seated.

The pressure sensors currently used for this type of applications, however, are rather complex sensors, which have the advantage of allowing for rather accurate and efficient detection of the weight that bears down on the car seat, but also the drawback of being excessively costly with respect to the type of product on which they are applied and with respect to the actual precision requirements for this type of detection.

A purpose of the present invention is thus to provide a pressure sensor able to detect the presence of a person on a seat, and in particular but not necessarily the presence of a child on a car seat, which is simple and economical whilst assuring good reliability in this type of applications.

DISCLOSURE OF THE INVENTION

This and other purposes are achieved by the characteristics of the invention as set out in the independent claim. The dependent claims delineate preferred and/or particularly advantageous aspects of the invention.

In particular, an embodiment of the invention makes available a pressure sensor, comprising:
  a first layer of electrically insulating material,
  a second layer of electrically insulating material superposed on the first layer, and
  at least one electrical switch,
  wherein said electric switch comprises:
  at least one electrical contact associated with the first layer, and
  at least one electrical conductor associated with a flexible portion of the second layer, which is separate from the first layer and is directly superposed on said electrical contact.

Thanks to this solution, the electrical conductor associated with the flexible portion of the second layer is normally separate from the electrical contact associated with the first layer, so that the electrical switch is normally open. However, when the flexible portion of the second layer is pressed towards the first layer with sufficient pressure to cause its deformation and flattening, the electrical conductor associated with the second layer comes in contact with the electrical contact associated with the first layer, closing the electrical switch.

By electrically detecting the opened or closed state of said switch, it is thus advantageously possible to detect whether the sensor is undergoing a greater or smaller pressure than the threshold pressure necessary to cause a deformation of the flexible portion of the second layer.

In this way, the pressure sensor delineated above is not able to measure the pressure that bears on it with exactitude, but it has the great advantage of being extremely simple, of being able to be manufactured at an extremely low cost and of being able to be used in all applications in which it is sufficient to know whether the pressure is greater or smaller than a threshold value, e.g. in the case of the detection of the presence of a person on a seat. In order to detect the opened or closed state of the switch, the sensor can comprise for example two electrical terminals permanently connected to the electrical contact associated with the first layer and to the electrical conductor associated with the flexible portion of the second layer, respectively, so that by applying a voltage to one of these two electrical terminals and measuring the voltage at the other electrical terminal, it is advantageously possible to detect whether the switch is open or closed.

According to another embodiment of the invention, at least a pair of electrical contacts electrically insulated from one another can be associated with the first layer, and the flexible portion of the second layer can be directly superposed on both said electrical contacts.

Also in this case, the electrical conductor associated with the second layer is therefore normally separate from the electrical contacts associated with the first layer, therefore the switch is open, but when the flexible portion of the second layer is pressed towards the first layer with sufficient pressure to cause its deformation and flattening, the electrical conductor associated with the second layer comes in contact with both the electrical contacts associated with the second layer, thus closing the electrical switch.

To detect the opened or closed state of the switch, the sensor can comprise two electrical terminals permanently connected respectively to each of the electrical contacts of the pair of electrical contacts associated with the first insulating layer, so that by applying a voltage to one of these two electrical terminals and by measuring the voltage at the other electrical terminal, it is advantageously possible to detect whether the switch is open of closed. According to an aspect of the present invention, the electrical contact/s and the electrical conductor can be embodied in the form of conductive strips applied respectively on the first and on the second layer, e.g. printed on the first and respectively on the second layer.

In this way, the simplicity and economy of the pressure sensor are increased yet further, and the pressure sensor is extremely thin, making it possible to reduce the bulk of any object or device in which it is to be incorporated or used.

According to another aspect of the invention, the flexible portion of the second layer is contoured, e.g. it may have a concave conformation with the concavity oriented towards the first layer.

This aspect provides a very simple solution to maintain normally separate the electrical conductor positioned on the second layer from the electrical contact/s positioned on the first layer.

However, this does not rule out the possibility that, in some embodiments, the flexible portion of the second layer can be flat.

In any case, it is always preferable for the shape and/or elasticity of the flexible portion of the second layer to be such as to allow its effective elastic return to its undeformed position, every time the pressure bearing thereon is removed.

According to another aspect of the invention, the sensor can comprise a third layer of electrically insulating material interposed between the first and the second layer, said third layer being provided with at least one through opening aligned with the flexible portion of the second layer.

In this way, the third layer serves substantially as a spacer that improves the separation between the electrical contact/s associated with the first layer and the electrical conductor associated with the flexible portion of the second layer, when said flexible portion is undeformed.

According to another aspect of the invention, the switch can comprise a support layer having greater flexibility than the flexible portion of the second layer, which is applied to the first layer from the opposite side with respect to said flexible portion and in alignment therewith.

The effect of this support layer is to sustain the switch, so that the pressure bearing thereon acts mainly in the sense of flattening the flexible portion of the second layer on the first layer, appropriately closing the circuit.

According to a preferred aspect of the invention, the sensor can comprise a plurality of the aforesaid switches, which can be variously arranged in the area defined by the first and by the second layer.

In this way, the sensor is advantageously capable of detecting the present of a weight in a relatively wide area and for different positions of a weight on said area. In particular, the number and arrangement of the switches can be selected according to the specific needs of the application for which the sensor is intended.

In this regard, the above-mentioned support layer can be made as a single continuous layer which is applied on the first layer so as to oppose all the flexible portions of the second layer, or as single portions individually applied on the first layer so that each of these is aligned with and/or opposed to a respective flexible portion of the second layer.

According to a further aspect of the invention, the sensor can comprise an electronic control unit, which can be advantageously configured to detect whether the switch is open or closed.

According to the first embodiment of the sensor, this electronic control unit can be electrically connected to the electrical contact associated with the first layer and with the electrical conductor associated with the flexible portion of the second layer.

In this way, the electronic control unit can detect whether the switch is open or closed by simply applying a voltage to the electrical contact and measuring the voltage on the electrical conductor or vice versa.

According to the second embodiment of the sensor, the electronic control unit can be electrically connected with the electrical contacts of the pair of electrical contacts associated with the first layer.

Also in this case, the electronic unit can indeed detect whether the switch is open or closed simply by applying a voltage to one of the electrical contacts and measuring the voltage on the other. In both the above-mentioned cases, the electronic unit may also be configured to generate a signal if the measurement indicates that the switch is closed or that a weight bears on the sensor, e.g. an acoustic, luminous signal or even simply an electrical signal indicating the outcome of the measurement.

In this regard, according to an aspect of the invention the electronic unit can be provided with wireless transmission means able to connect the electronic unit with a separate electronic device, e.g. a portable electronic device such as a laptop, a tablet or a smartphone, or a fixed electronic device, e.g. the IT system of an operating unit or any other processing system.

Thanks to this solution, the signal containing the information about the measurement carried out by the sensor can advantageously be transmitted to other devices to be used and/or further processed, depending on the specific application for which the sensor is intended.

According to another aspect of the invention, the sensor can further comprise an accelerometer connected to the electronic control unit.

In this way, the sensor is not only able to detect a weight but also motion information that can advantageously be used together with the first information in some specific applications of the sensor.

A specific embodiment of the present invention makes available a pillow comprising a soft mat and a sensor as delineated above, which can be incorporated, inserted or even simply fastened to the soft mat.

In this way, an object is made available which can advantageously set down on any existing seat, e.g. on a chair or on an armchair.

Alternatively, the invention can be embodied directly in the form of a seat, e.g. a chair or an armchair, which comprises the sensor delineated above.

In this way, the sensor is integrated in the seat, overall obtaining a device able to perform a higher number of functions than traditional seats.

In particular, the sensor can be incorporated or inserted in a padding that coats the seat, e.g. a padding that defines the seating surface and/or the backrest and/or the armrests and/or any other suitable surface for the specific purposes for which the sensor is used.

According to a preferred embodiment of the present invention, the seat can be a car seat for children.

In this way, the car seat provided with the sensor can advantageously be used within an unattended child reminder system as delineated in the foreword.

BRIEF DESCRIPTION OF THE DRAWINGS

Additional characteristics and advantages of the invention shall become readily apparent from the description that follows, provided by way of example but without limitation, with the aid of the figures illustrated in the accompanying table.

FIG. 1 is a schematic view of a pressure sensor according to an embodiment of the present invention.

FIG. 2 is the section II-II of FIG. 1.

DETAILED DESCRIPTION

Figure 3:
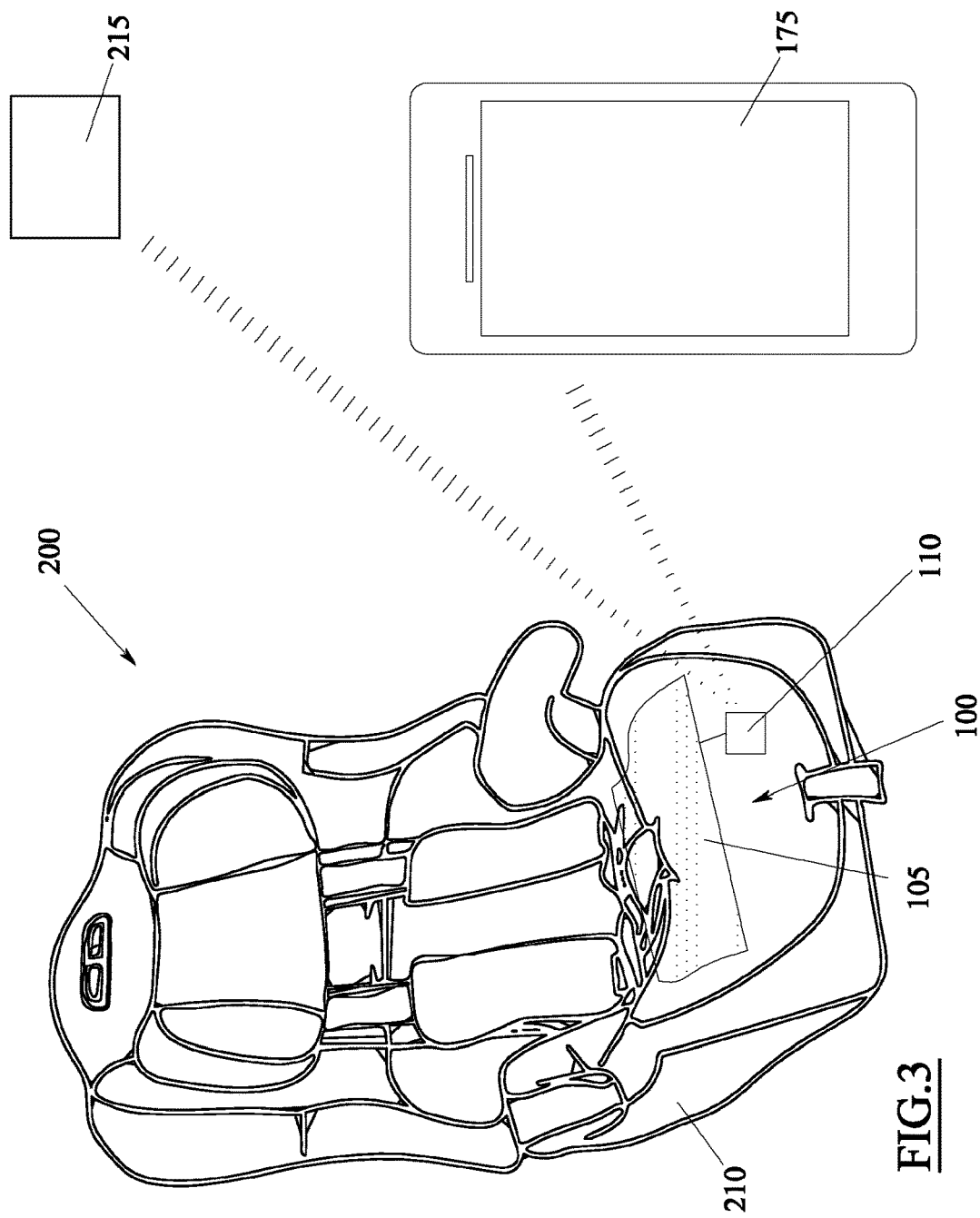
FIG. 3 is a schematic view of an unattended child reminder system in cars.

The aforementioned figures show a pressure sensor 100, which is generically able to detect whether a pressure exceeding a pre-set threshold value is bearing on the area thereby defined.

The sensor 100 comprises a sensitive element 105, shaped substantially as a mat, and an electronic control unit 110 connected to said sensitive element 105.

As shown in FIG. 2, the sensitive element 105 comprises a first layer 115 of electrically insulating or non-conductive material with generally planar shape and preferably flexible, which can be obtained for example in the form of a sheet or of a thin membrane.

In particular, the first layer 115 can be made of a polymeric material, e.g. of polyethylene terephthalate (PET) or the like, and can have thickness of less than 0.3 mm, e.g. substantially equal to 0.1 mm.

Superposed on the first layer 115, the sensitive element 105 comprises a second layer 120 of electrically insulating or non-conductive material with generally planar shape and preferably flexible, which can also be obtained in the form of a sheet or of a thin membrane.

The second layer 120 can also be made of a polymeric material, e.g. of polyethylene terephthalate (PET) or the like, and can have thickness of less than 0.3 mm.

Preferably the thickness of the second layer 120 can be at least slightly greater than the thickness of the first layer 115, e.g. substantially equal to 0.18 mm.

The second layer 120 presents a plurality of flexible portions 125, whose number and whose arrangement on the second layer 120 can vary according to the specific application needs.

Each of these flexible portions 125 is normally separate and distanced from the first layer 115.

In particular, each flexible portion 125 is preferably obtained in the form of a bulge that projects in relief from the second layer 120 in opposite direction with respect to the first layer 115.

Each flexible portion 125 can thus have concave shape, e.g. a generally cupola-like shape, with the concavity oriented towards the first layer 115.

The flexible portions 125 can be made in a single body with the second layer 120 by means of any known system, e.g. by thermoforming or by molding.

Figure 4:
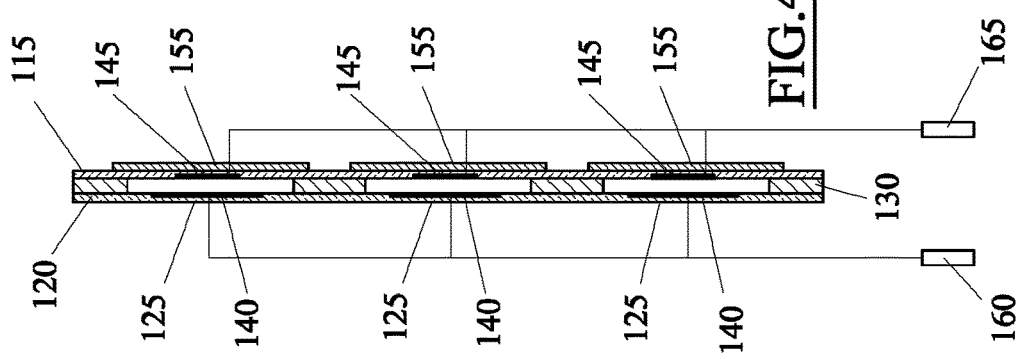
FIG. 4 is a section of FIG. 2 according to an alternative embodiment of the invention.

In some embodiments, however, the second layer 120 could have a totally flat shape and, with it, also the flexible portions 125 could be totally flat, as illustrated for example in FIG. 4.

The distance between the top of each flexible portion 125 and the plane of lay of the second layer 120 can be between 0.8 mm and 1.2 mm, e.g. equal to 1 mm.

In this way, between each flexible portion 125 of the second layer 120 and the first layer 115 a thin interspace is defined, which maintains the two layers locally separated.

These interspaces can be empty or contain an electrically non-conductive gas, e.g. just air.

To define and/or increase the distance between the first layer 115 and the flexible portions 125 of the second layer 120, the sensitive element 105 can comprise a third layer 130 of electrically insulating or non-conductive material with generally planar shape and preferably flexible, which can also be obtained for example in the form of a sheet or of a thin membrane.

This third layer 130 is interposed between the first layer 115 and the second layer 120 and it has a plurality of through openings, each of which is substantially aligned with a respective flexible portion 125 of the second layer 120 (aligned with respect to an orthogonal direction to the plane of lay of the first layer 115).

The third layer 130 can be made of a polymeric material, e.g. of polyethylene terephthalate (PET) or the like, and can have thickness of less than 0.5 mm, e.g. substantially equal to 0.275 mm.

To each flexible portion 125 of the second layer 120 is associated an electrical conductor 140.

This electrical conductor 140 can be embodied by at least one conductive strip which is applied on the flexible portion 125 of the second layer 120, e.g. which is applied on the surface of the flexible portion 125 that faces the first layer 115.

The conductive strip can be obtained by a printing process with a silver based paste or a carbon-based paste.

According to the embodiment illustrated in FIG. 2, at each flexible portion 125 of the second layer 120, the first layer 115 can be provided with a pair of electrical contacts electrically insulated from each other, of which a first electrical contact 145 and a second electrical contact 150.

Each of these electrical conductors 140 and 150 can be embodied by at least one conductive strip which is applied on the first layer 115, e.g. which is applied on the surface of the portion of the first layer 115 that faces the corresponding flexible portion 125 of the second layer 120.

In this case, too, each conductive strip can be obtained by a printing process with a silver-based paste or a carbon-based paste.

Thanks to the interspace that separates the first layer 115 from each flexible portion 125 of the second layer 120, each electrical conductor 140 remains normally separate and distanced from the corresponding electrical contacts 145 and 150 which then remain insulated as shown in FIG. 2.

However, when a flexible portion 125 is pressed towards the first layer 115 with sufficient pressure to cause its deformation and flattening, the electrical conductor 140 comes in contact with both the corresponding electrical contacts 145 and 150, connecting them electrically.

Each electrical conductor 140 and the respective electrical contacts 145 and 150 thus define an electrical switch that remains normally open and that closes only when the weight bearing on the flexible portion 125 of the second layer 120 exceeds a pre-set threshold value.

This threshold value, which depends on the conformation of the flexible portion 125 and on the elasticity of the material, is preferably between 250 grams and 350 grams, e.g. equal to 300 grams.

To make the flattening of the flexible portion 125 of the second layer 120 more certain, each switch can further comprise a support layer 155 having greater rigidity than the flexible portion 125, which is fastened to the first layer 115 at the opposite side from the second layer 120.

This support layer 155 can have generally planar and thin shape and can be made for example of cardboard or paperboard.

The support layer 155 can be a single one for all switches or, more preferably, it can be divided into a plurality of separate support layers 155, each of which is aligned to the flexible portion 125 of the related switch (aligned with respect to an orthogonal direction to the plane of lay of the first layer 115).

The first electrical contacts 145 of all the switches of the sensitive element 105 can be electrically connected to a single electrical terminal 160, e.g. through an electrical line which can be associated with (e.g. printed on) the first layer 115.

Similarly, the second electrical contacts 145 of all the switches of the sensitive element 105 can be electrically connected to a single electrical terminal 165, separate from the electrical terminal 160, e.g. through another electrical line which can be associated with (e.g. printed on) the first layer 115.

According to the alternative embodiment illustrated in FIG. 4, the sensitive element 105 of the sensor 100 can be different from what has been described above in that, at each flexible portion 125 of the second layer 120, the first layer 115 can be provided with a single electrical contact 145.

Thanks to the interspace separating the first layer 115 from each flexible portion 125 of the second layer 120, each electrical conductor 140 is therefore normally separate and spaced apart from said electrical contact 145, with which it comes in contact only when the flexible portion 125 is pressed towards the first layer 115 with sufficient pressure to cause its deformation and flattening.

Each electrical conductor 140 and the respective electrical contact 145 thus define a further electrical switch that remains normally open and that closes only when the weight bearing on the flexible portion 125 of the second layer 120 exceeds a pre-set threshold value.

However, in this case the electrical terminal 160 can be electrically connected to the electrical conductors 140 of all switches of the sensitive element 125, whereas the electrical terminal 165 can be connected to all the electrical contacts 145, for example via respective electric lines which can be respectively associated with (for example printed on) the second layer 120 and the first layer 115.

In both cases described above, the two electrical terminals 160 and 165 can be electrically connected with the electronic unit 110, which can be advantageously configured to verify whether at least one of the aforesaid switches is closed, i.e. whether the sensitive element 105 is subjected to a weight exceeding the threshold value.

To do so, the electronic unit 110 can be configured to apply a voltage to one of the electrical terminals, e.g. to the electrical terminal 160, and to measure the voltage on the other electrical terminal, e.g. on the electrical terminal 165.

If the voltage on the electrical terminal 165 is nil, then all the switches are open, if instead the voltage is equal to the one applied to the electrical terminal 160, then at least one switch is closed and hence the weight on the sensitive element 105 exceeds the set threshold.

If at least one switch is closed, the electronic unit 110 can be configured to generate a signal indicating the outcome of the measurement.

In this regard, the electronic unit 110 can be provided with communication means 170 able to connect the electronic unit 110 wirelessly with corresponding communication means of a separate electronic device 175, e.g. a smartphone or another mobile or fixed electronic device.

The communication means 170 can comprise for example one or more antennas, which are able to emit, constantly or at regular time intervals, a pre-set radio signal in the surrounding space.

In particular, the communication means 170 can be configured to constitute, with the electronic device 175, a radio communication system, e.g. a Bluetooth Low Energy radio communication system, or a Wi-Fi radio communication system, which allows the transmission and the reception of radio signals at short distances, generally a few meters.

Thanks to this solution, the signal containing the information about the measurement carried out by the electronic unit 110 can advantageously be transmitted to the electronic device 175 to be used and/or further processed. The electronic device 175 can comprise e.g. interface means 180 with the user, which can comprise at least one between a display screen, a light emitter, a speaker and a vibration generator.

In some embodiments, the sensor 100 can further comprise an accelerometer 185, e.g. a three-axis accelerometer, integrated or connected with the electronic unit 110.

In this way, the sensor 100 is able to detect and transmit also motion information which can advantageously be used together with the weight information as shall be explained farther on.

A specific application of the sensor 100 described above can be within a system 200 to prevent inadvertently leaving a child unattended in a car. As is schematically shown in FIG. 3, the system 200 comprises a car seat 210 for children, which is intended to be set down on one of the seats of the car, e.g. on one of the rear seats, to be secured by means of the seatbelts or other fastening systems known in themselves.

In the car seat 210 is integrated the pressure sensor 100 described previously, whose sensitive element 105 can be incorporated or inserted in a padding that coats the car seat, e.g. a padding that defines the seating surface and/or the backrest and/or the armrests.

In general, the sensitive element 105 has to be placed in a position in which the various switches constructed therein are able to detect whether or not a child is present on the car seat 210.

The electronic unit 110 can also be inserted in the car seat 210, e.g. placed in the same padding, or it can remain fastened externally.

The electronic unit 110 can be connected wirelessly with the separate electronic device 175 which, in this type of application, is a mobile device able to be carried by the parent who drives the car, e.g. a smartphone or the like.

In this way, the parent does not have to carry other devices in addition to those (s)he usually possesses, inasmuch as the smartphone can be used to install therein a software application (App) which, when it is executed by the processing means of the smartphone, enables the latter to interact with the electronic unit 110 of the pressure sensor 100 integrated in the car seat 210. The operation of the system 200 provides for the electronic unit 110 to be configured to measure not only the weight but also the distance between the car seat 210 and the external electronic device 175.

It this distance exceeds a certain threshold value, i.e. if the parent has moved away from the car, and if at the same time the sensitive element 105 still detects the presence of the child on the car seat 210, the electronic unit 110 will transmit an alarm message and/or signal to the electronic device 175. To evaluate the distance between the electronic device 175 and the car seat 210, the electronic unit 110 can use the radio connection with the electronic device 175.

For example the electronic unit 110 can establish that the distance between the electronic device 175 and the car seat 210 has exceeded the pre-set threshold when the radio communication with the electronic device 175 is interrupted or when the intensity of the exchanged radio signals falls below a pre-set value.

In some embodiments, the electronic unit 110 transmits the alarm message and/or signal not only to the electronic device 175 but also to a remote control unit 215.

This remote control unit 215 can be connected to the electronic unit 110 through a radio communication system, e.g. a Sub-GHz radio communication system like a Semtech LoRa or Sigfox radio infrastructure, i.e. they are respectively able to emit and to receive a radio signal with frequency below 1 GHz.

This radio connection allows the long range transmission and receipt of radio signals, typically within a range of up to 3 km in an urban area and up to 15 km in rural areas, and with low energy consumption, making it possible to reduce effectively the dimensions of the electronic unit 110.

This type of radio infrastructures with frequency below one GHz also have the advantage of allowing, in some configurations, the geographic localization of the electronic unit 110, with no need to use an additional GPS system.

In this way, the remote control unit 215 can in turn send alarm messages and/or signals also to other electronic devices, e.g. to the smartphone of the other parent or of another responsible person, possibly also indicating the geographic position of the car seat 210 on which the child was left unattended.

If the electronic unit 110 is also provided with accelerometers 185, the unit can be able to detect also any movements of the child on the car seat 210 and transmit this information, too, to the electronic device 175 and/or to the remote control unit 215.

Alternatively or additionally, the accelerometers 185 can be used by the electronic unit 110 to determine whether the car seat 210 has undergone an impact or a sharp deceleration, for example indicative of the fact that the car has been in an accident, or in such a way as to be able to transmit to the remote control unit 215 an appropriate alarm signal and alert rescuers. According to an alternative embodiment, instead of being directly integrated in the car seat 210, the pressure sensor 100 could be integrated in a pillow able to be manufactured and sold separately and able to be set down on the car seat 210 itself.

This pillow could comprise, for example, a soft mat provided with seats wherein are housed the sensitive element 105 and the electronic unit 110, and a lining able to coat the soft mat.

In this way, the unattended child reminder system could be applied to any existing car seat 210.

In conclusion, it should be pointed out that the pressure sensor 100 described above could be used in similar ways not only to detect the presence of a child on a car seat, but more in general to monitor the presence of a person on any type of seat.

In particular it could be used to monitor the elderly, e.g. to inform a caregiver when an elderly person rises from a chair or from an armchair, to enable the caregiver to intervene promptly if this action is hazardous for the elderly person.

Obviously, a person having ordinary skill in the art may make numerous technical/applicative modifications to the pressure sensor 100 described above, without thereby departing from the scope of the invention as claimed below.

The invention claimed is:

1. A pressure sensor, comprising:
   a first layer of electrically insulating material,
   a second layer of electrically insulating material superposed on the first layer, and
   at least one electrical switch,
   wherein said at least one electrical switch comprises:
      at least one electrical contact associated with the first layer, and
      at least one electrical conductor associated with a flexible portion of the second layer, which is separate from the first layer and is directly superposed to said at least one electrical contact,
   said at least one electrical switch comprises a support layer having greater rigidity than the flexible portion of the second layer, which is applied on the first layer at an opposite side from said flexible portion and aligned therewith.

2. The sensor according to claim 1, wherein at least one pair of electrical contacts electrically insulated from one another is associated with the first layer, and wherein the flexible portion of the second layer is directly superposed on said at least one pair of electrical contacts.

3. The sensor according to claim 1, wherein the at least one electrical contact and the at least one electrical conductor are in the form of conductive strips applied respectively on the first and on the second layer.

4. A car seat for children, comprising a sensor according to claim 1.

5. The sensor according to claim 1, wherein the flexible portion of the second layer presents a concave conformation with concavity oriented towards the first layer.

6. The sensor according to claim 1, further comprising a third layer of electrically insulating material interposed between the first and the second layer, said third layer being provided with at least one through opening aligned with the flexible portion of the second layer.

7. The sensor according to claim 1, wherein said at least one electrical switch is a plurality of electrical switches.

8. The sensor according to claim 1, further comprising an electronic unit electrically connected to the electrical contact associated with the first layer and to the at least one electrical conductor associated with the flexible portion of the second layer.

9. The sensor according to claim 2, further comprising an electronic unit electrically connected with the at least one pair of electrical contacts associated with the first layer.

10. The sensor according to claim 8, wherein the electronic unit is provided with wireless communication means configured to connect the electronic unit with a separate electronic device.

11. The sensor according to claim 8, further comprising an accelerometer connected with the electronic unit.

12. A pillow comprising a soft mat and a sensor according to claim 1.

13. A seat comprising a sensor according to claim 1.

* * * * *